United States Patent
Ries-Mueller

(10) Patent No.: US 6,856,044 B2
(45) Date of Patent: Feb. 15, 2005

(54) DEVICE FOR PROTECTING A MOTOR VEHICLE AGAINST THEFT

(75) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 402 days.

(21) Appl. No.: 10/035,536

(22) Filed: Nov. 7, 2001

(65) Prior Publication Data

US 2002/0109408 A1 Aug. 15, 2002

(30) Foreign Application Priority Data

Nov. 7, 2000 (DE) .......................................... 100 55 075

(51) Int. Cl.[7] .............................................. B60R 25/00
(52) U.S. Cl. ...................... 307/10.2; 307/9.1; 307/10.1; 340/541
(58) Field of Search ................................. 307/9.1, 10.2

(56) References Cited

U.S. PATENT DOCUMENTS

| 4,356,489 A | * | 10/1982 | Hirota et al. ................. 342/71 |
| 4,929,925 A | | 5/1990 | Bodine et al. |
| 5,745,030 A | * | 4/1998 | Aaron .................... 340/426.11 |
| 5,927,112 A | * | 7/1999 | Yamashita .................... 70/252 |
| 5,929,753 A | | 7/1999 | Montague |

FOREIGN PATENT DOCUMENTS

| DE | 196 42 607 | 4/1998 |
| EP | 0 650 875 | 5/1995 |

* cited by examiner

Primary Examiner—Robert L. DeBeradinis
(74) Attorney, Agent, or Firm—Kenyon & Kenyon

(57) ABSTRACT

A device is proposed for protecting a motor vehicle against theft. At least one signal processing evaluates a sensor signal of a sensor in a first operating mode for generating an activation signal for a functional unit. A signal unit evaluates the sensor signal in a second operating mode, which differs from the first operating mode, for producing an activation signal for an alarm-signal generator. An operating-state detection is provided for detecting whether the motor vehicle is in a deactivated state. The second operating mode is activated when the motor vehicle is in the deactivated state; the first operating mode is activated when the motor vehicle is in the activated state.

9 Claims, 2 Drawing Sheets

DEVICE FOR PROTECTING A MOTOR VEHICLE AGAINST THEFT

FIELD OF THE INVENTION

The present invention is based on a device for protecting a motor vehicle against theft.

BACKGROUND INFORMATION

U.S. Pat. No. 5,929,753 describes a safety and security system in which, to safeguard a motor vehicle, the distance of the floor of the motor vehicle from the underlying ground upon which the motor vehicle is located is utilized for the theft protection. If the distance increases, for example, by lifting the motor vehicle, then a situation suggesting theft is inferred, which leads to triggering of an alarm.

SUMMARY OF THE INVENTION

The object of the present invention is to utilize a sensor system, present in any case, for further functions.

The device of the present invention for protecting a motor vehicle against theft includes at least one signal processing that evaluates at least one sensor signal in a first operating mode for generating an activation signal of a functional unit. At least this or a further signal processing evaluates the sensor signal in a second operating mode, which differs from the first operating mode, for producing an activation signal for an alarm-signal generator. An operating-state detection is provided for detecting whether the motor vehicle is in a deactivated state. The second operating mode is activated when the motor vehicle is in the deactivated state; the first operating mode is activated when the motor vehicle is in the activated state. Thus, according to the present invention, a sensor system, used in any case for the normal operation of the motor vehicle, is also evaluated in the deactivated state of the motor vehicle for detecting a theft attempt. By skillful selection of the sensor system, it is possible to dispense with sensors solely for the purpose of theft detection. The production costs of a theft warning system are thereby reduced. In addition, sensors which are present anyway can be utilized for, a redundant theft-detection evaluation, which means on one hand, a theft is reliably detected, and on the other hand, false triggerings of a theft warning system are avoided.

Particularly suitable as sensors are those which route distance and/or speed information, based on radar or ultrasound, to an automatic ranging system or to a parking-aid control unit during normal operation (first operating mode). Also suitable are sensors for detecting height information, e.g. of the shock absorber, or for detecting change in the inclination of the body, whose output signals are of use as input signals to a control unit for regulation of the chassis. During the activated operation of the motor vehicle, the control unit for regulating the chassis triggers actuators for influencing the chassis as a function of the acquired sensor information. In the deactivated state of the motor vehicle, the information provided by the sensor suite is evaluated with a view to a possible theft attempt when, for example, the inclination of the body changes beyond a specific limiting value. In turn, no additional sensor system is necessary. A sensor for determining the tank fluid level is also suitable for theft detection. If in the deactivated state of the motor vehicle, the tank level changes beyond a tolerance value, then a manipulating event is inferred. Sensors which, during normal operation, transmit information such as the wheel speed, the yaw rate or other acceleration data to an antilock-braking-system control unit or an electronic stability-program control unit, can also be evaluated in the deactivated state for theft detection.

In one expedient further development, provision is made to activate the second operating mode cyclically. If the sensor signal detected in the first cycle and the sensor signal detected in the second cycle deviate unacceptably from one another, a manipulation can be inferred, so that the alarm-signal generator is activated. Consequently, on one hand, the signal processing in the shut-down state of the motor vehicle consumes little current; on the other hand, sufficient accuracy of a theft detection is achieved.

DETAILED DESCRIPTION

Figure 1:
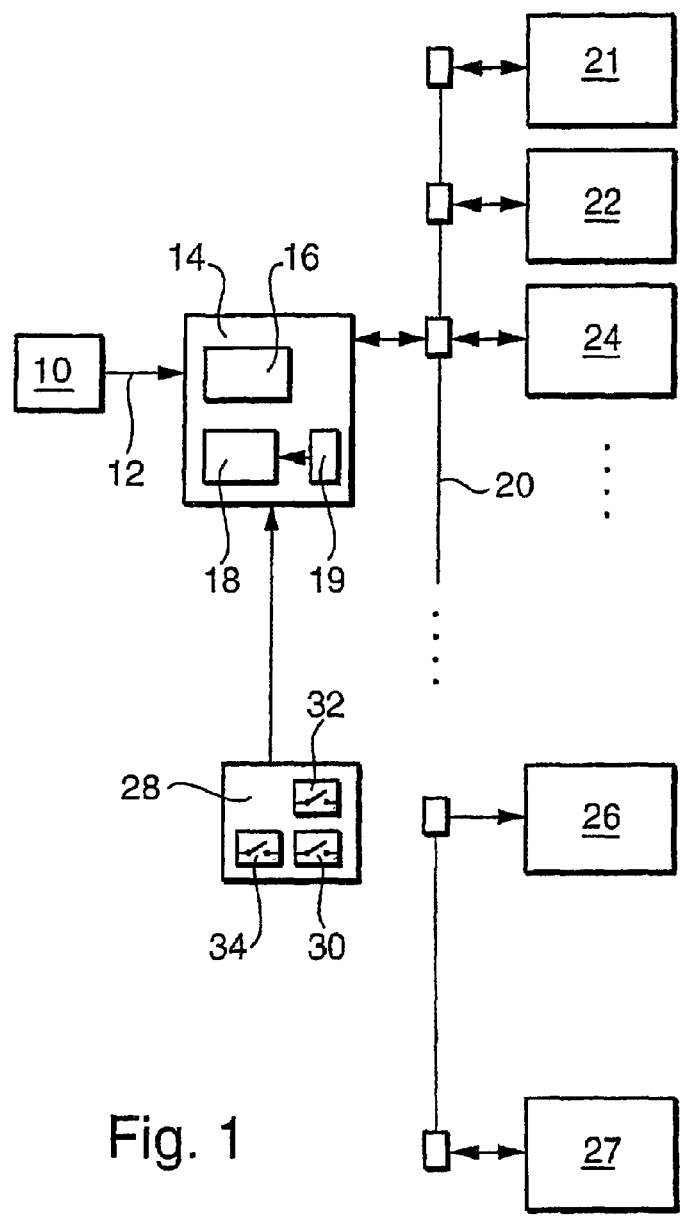
FIG. 1 shows a block diagram of a general design.

A sensor signal 12 from a sensor 10 is supplied to a control unit 14. Control unit 14 is able to evaluate sensor signal 12 in a first operating mode 16 or in a second operating mode 18. Also integrated in control unit 14 is an activation control 19 which activates sensor-signal evaluation 12 in second operating mode 18. Control unit 14 exchanges signals via a bus system 20 with a display unit 21, a first functional unit 22, a second functional unit 24, an alarm-signal generator 26 and an intrusion detection 27. Also supplied to control unit 14 is an output signal from an operating-state detection 28 composed of a touch-sensitive locking switch 30, a touch-sensitive door switch 32 and an ignition/starter switch 34.

Figure 2:
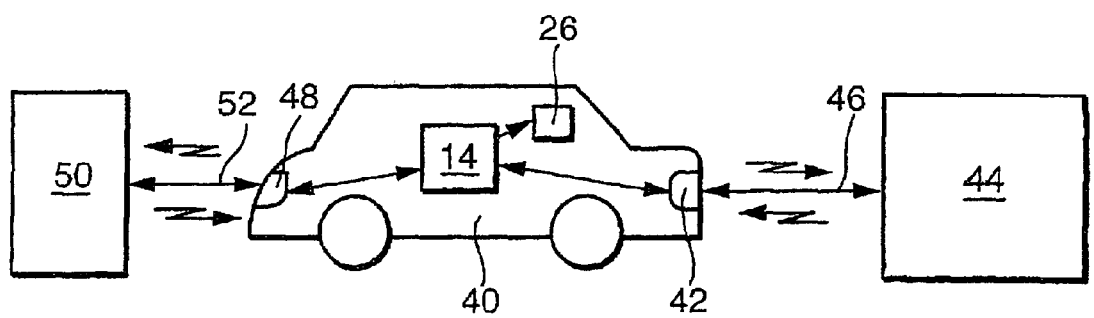
FIG. 2 shows an exemplary embodiment based on a proximity evaluation.

In the exemplary embodiment according to FIG. 2, a front distance sensor 42 is arranged in the front end of a motor vehicle 40, and a rear distance sensor 48 is arranged in the rear end. Front and rear distance sensors 42, 48 exchange signals with control unit 14. In turn, control unit 14 triggers alarm-signal generator 26. Motor vehicle 40 is situated between a first obstacle 44 and a second obstacle 50. Front distance sensor 42 is at a front distance 46 from first obstacle 44; rear distance sensor 48 is at a rear distance 52 from second obstacle 50.

Configured in control unit 14 is a microcontroller which is able to evaluate sensor signal 12, provided by sensor 10, either in a first operating mode 16 or in a second operating mode 18. First operating mode 16 is activated during normal operation of motor vehicle 40. Understood by normal operation is when motor vehicle 40 is switched on (ignition on) and/or is being driven. In this first operating mode 16, control unit 14 generates triggering signals for display unit 21 and/or functional units 22, 24 according to specific open-loop and closed-loop control algorithms as a function of sensor signal 12.

Control unit 14 can now also evaluate sensor signal 12 in a second operating mode 18. Second operating mode 18 is activated when motor vehicle 40 has been deactivated and/or the alarm system function has been primed. In second operating mode 18, at least one first sensor signal 12, detected at first instant t1, is compared to a second sensor signal 12 detected at a second instant t2. If the two sensor signals detected at instants t1, t2 deviate from one another by a predefinable limiting value, then a manipulation of motor vehicle 40 is inferred. In this case, control unit 14 sends an activation signal via bus system 20 to alarm-signal generator 26 to make the surroundings or the user aware of a theft attempt.

For example, alarm-signal generator 26 can be a siren or a lighting device, preferably driven in a specific flashing frequency, which attracts attention.

The microcontroller of control unit 14 decides which of the two operating modes 16, 18 is to be activated in light of the output signal of operating-state detection 28. For example, if touch-sensitive locking switch 30 signals that motor vehicle 40 was already properly locked, then a deactivated motor vehicle 40 is inferred and second operating mode 18 is activated instead of first operating mode 16 for the sensor-signal evaluation. Second operating mode 18 could also be preselected in connection with touch-sensitive door switch 32. The sensor-signal evaluation for theft detection purposes follows either in response to a one-time opening of the door and/or in response to subsequent closing. A query of ignition/starter switch 34 is also suitable for this purpose. Thus, second operating mode 18 is preferably triggered by "ignition off". The query of a signal as to whether an ignition key is in the ignition lock exists as a further possibility. If it is removed, then a touch-sensitive switch determining the key position changes its state, which is interpreted along the lines of a desire to deactivate motor vehicle 40. If no key is in the lock, the sensor-signal evaluation takes place in the second operating mode. Alternatively, second operating mode 18 could be activated when the alarm system function has been deliberately primed by the user, for example by a specific operator sequence of a remote control (not shown).

If no signal pointing to a deactivated state of motor vehicle 40 is present on the part of operating-state detection 28, then first operating mode 16 is activated instead of second operating mode 18. So that the microcontroller of control unit 14 does not constantly consume current in the deactivated state of motor vehicle 40, it can dwell basically in rest operation. In addition, an activation control 19 is provided which wakes up the microcontroller so that it undertakes a sensor-signal evaluation for the theft detection in second operating mode 18. For example, this could happen cyclically. If the microcontroller is activated, it detects sensor signal 12 at instant t2. It subsequently compares sensor signal 12, detected at instant t2, to a sensor signal 12 ascertained at a previous instant t1, and compares it to instantaneously detected sensor signal 12 at instant t2. The difference between the two signals is formed for the purpose of theft detection. This difference is compared to a predefinable limiting value. If the amount of the difference lies above the amount of the limiting value, then an unacceptable change in the ambient conditions is inferred, which could have brought about a theft attempt. Alarm-signal generator 26 is activated.

Instead of a cyclical activation, provision could also be made to evaluate sensor signal 12 redundantly for the plausibility reasonableness check of a break-in attempt detected by intrusion detection 27. If a signal of intrusion detection 27 exists which implies that a break-in attempt could have been undertaken, the signal evaluation already described is carried out in second operating mode 18. If, within the context of this check, the result is also that a theft attempt could have been undertaken, then alarm-signal generator 26 is activated. However, if this evaluation does not point to such a break-in attempt, then activation of alarm-signal generator 26 does not occur.

This general principle is now suitable for a number of sensor systems for generating triggering signals for the most varied functional units 22, 24. For example, a height-information sensor of a shock absorber is provided as sensor 10. In first operating mode 16, this corresponding sensor signal 12 is evaluated in control unit 14 for the regulation of the chassis. Still further parameters can be utilized to this end. Corresponding actuators as examples for possible functional units 22, 24 can be triggered via bus system 20 as a function of sensor signal 12 (height information of the shock absorber), in order to set a specific setpoint stipulation for the height of the shock absorber determined by control unit 14. If motor vehicle 40 is switched off and operating-state detection 28 recognizes a deactivated motor vehicle 40, then this height information of the shock absorber is evaluated in second operating mode 18. For example, with the shutdown of motor vehicle 40, this height information is stored at instant t1. Subsequently, this height information of the shock absorber continues to be queried either constantly or cyclically. New sensor signal 12 thus ascertained at instant t2 is compared to sensor signal 12 at instant t1. In response to a large deviation, alarm-signal generator 26 is activated. This change in the height of the shock absorber could have been caused by manipulative lifting of motor vehicle 40.

For example, a tank-level sensor is suitable as a further possible sensor 10. Its sensor signal 12 is evaluated in a first operating mode 16 by control unit 14. In the simplest case, it could be a fuel-level indicator which generates a warning signal upon falling below a critical tank level. This warning signal arrives via bus system 20 at display unit 21 and is converted there into a corresponding warning display. With the deactivation of motor vehicle 40, or possibly later, sensor signal 12 is stored at instant t1. If a sensor signal 12 ascertained at later instant t2 exceeds sensor signal 12 detected at instant t1, an activation of alarm-signal generator 26 follows in turn. Namely, a change in the level could have been caused, for example, by lifting motor vehicle 40 on one side, as could occur, for instance, during loading onto a commercial vehicle.

For example, wheel-speed sensors present themselves as a further sensor system 10. In first operating mode 16, they are evaluated in control unit 14 to, for example, prevent locking of the wheels or skidding of motor vehicle 40. Consequently, the antilock function or the electronic stability-program function of first operating mode 16 is implemented in control unit 14. Yaw sensors, or other acceleration sensors or inclination sensors are suitable as further sensor systems which an ABS-ESP control unit 14 evaluates. If significant deviations result within the context of the evaluation in second operating mode 18, this can again lead to activation of alarm-signal generator 26.

Figure 3:
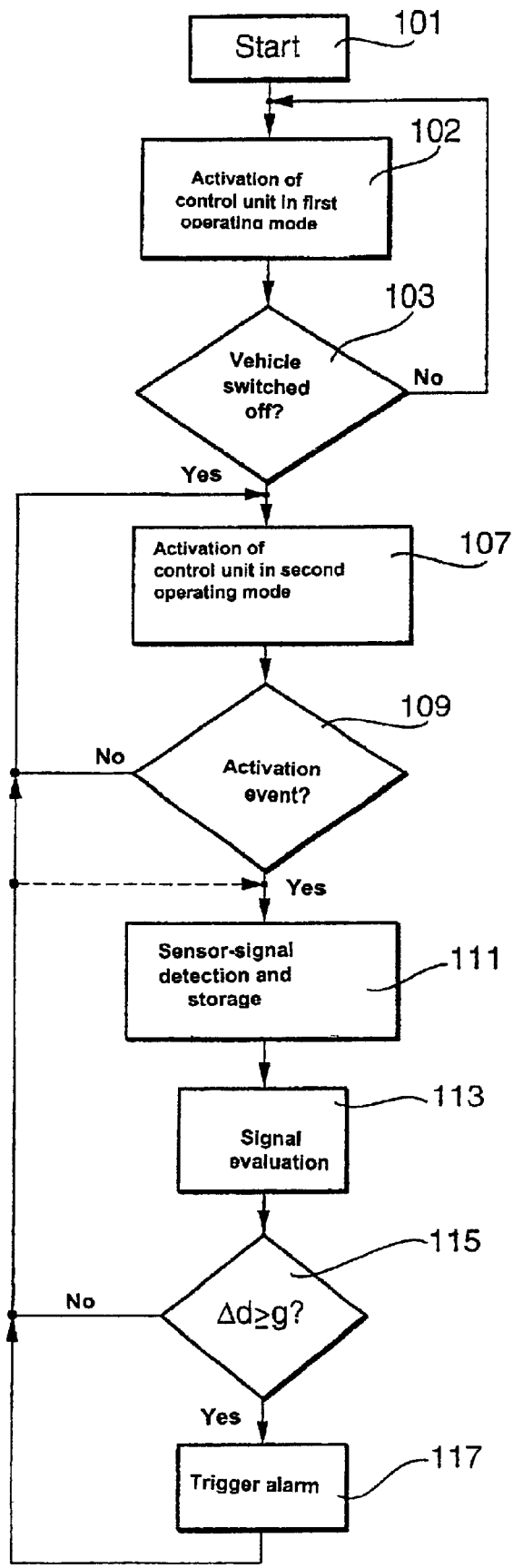
FIG. 3 shows a flowchart for the sensor-signal evaluation.

A further sensor system is explained more precisely in conjunction with FIGS. 2 and 3. In this case, it is about distance and/or speed sensors 42, 48 which detect the distance and/or the speed with respect to a front obstacle 44 and/or a rear obstacle 50.

To this end, front and rear distance sensors 42, 48 are provided which are arranged on the front and rear side of motor vehicle 40. For example, sensors 10 operate on the basis of radar or ultrasound. The distance and/or the speed of obstacles 44, 50 can be inferred in terms of the transit time of the reflected wave.

The operating method of the device shown in FIG. 2 shall now be described more precisely in conjunction with the flowchart according to FIG. 3. The user starts motor vehicle 40, step 101. On the basis of the signal "ignition on", operating-state detection 28 recognizes that motor vehicle 40 has been properly activated. Control unit 14 undertakes a sensor-signal detection in first operating mode 16. Here, for example, an adaptive cruise control of motor vehicle 40 is carried out, so that a specific distance can be honored with respect to a motor vehicle driving ahead. Thus, control unit 14 constantly evaluates radar or ultrasound signals 12 to ascertain the distance and the relative speed with respect to the preceding motor vehicle. In connection with the specific actual speed, a setpoint value is now stipulated for the engine control unit as example for a functional unit 22, 24, so that the desired distance to the preceding motor vehicle can be maintained. The corresponding control algorithms are implemented in step 102.

Alternatively or in addition, the distance sensors can also be utilized for the purposes of the Park Pilot within the framework of first operating mode 16. For example, at low speeds, the distance to a front and a rear obstacle 44, 50 is constantly monitored. If front distance 46 and/or rear distance 52 reaches a critical limiting value, then Park-Pilot control unit 14 generates a warning signal which arrives via bus system 20 at display unit 21. For example, the display unit generates a flashing warning signal. An acoustical warning could also be provided. This is carried out when motor vehicle 40 is activated in first operating mode 16 according to step 102.

If, at this point, the user has parked his motor vehicle 40, then on the basis of ignition/starter switch 34, touch-sensitive locking switch 30 or touch-sensitive door switch 32, it is recognized that motor vehicle 40 has been switched off and deactivated. The appropriate query is carried out in step 103. Alternatively, second operating mode 18 could be activated in conjunction with the priming of the alarm function, for example, when the user operates the remote control in a specific manner. This deactivation event can thereupon be used simultaneously to detect and store distances 46, 52 at instant t1.

The sensor-signal evaluation is now carried out in second operating mode 18, step 107. In step 109, it is queried cyclically whether an activation event has occurred. For example, such an activation event could be a predetermined time lapse for the cyclical sensor-signal detection. The signals of an optionally provided intrusion detection could be utilized as a further activation event. The further steps are then used for a plausibility reasonableness check of the intrusion detection.

If, at this point, an activation event has occurred, then sensor signal 12 available at this instant t2 is detected and optionally stored, step 111. Consequently, two front distances 46 at instants t1 and t2, as well as two rear distances 52 at instants t1 and t2 are available for the following signal evaluation, step 113. If no changes in distance can be established at instants t1 and t2, then the theft detection is continued in step 107, or possibly with step 111, without triggering alarm-signal generator 26. However, in response to a change in distance exceeding a predefinable limiting value, a theft could be inferred. During the further plausibility reasonableness check, it is examined whether the front distance and rear distance 52 are changing inversely, that is to say, whether, for example, front distance 46 is becoming smaller, while on the other hand, rear distance 52 is increasing. It is then assumed that motor vehicle 40 is moving, and not the obstacle. In this case, a theft is suspected, alarm-signal generator 26 being activated in step 117.

What is claimed is:

1. A device for protecting a motor vehicle against theft, comprising:

a sensor for providing at least one sensor signal;

a functional unit;

an alarm-signal generator;

at least one signal processing unit for evaluating the at least one sensor signal in a first operating mode for generating a triggering signal for the functional unit, the at least one signal processing unit evaluating the at least one sensor signal in a second operating mode for generating a triggering signal for an alarm-signal generator, the second operating mode differing from the first operating mode; and an operating-state detection unit for detecting whether at least one of the motor vehicle is in a deactivated state and an alarm function has been primed, wherein:

the second operating mode is activated when at least one of the motor vehicle is in the deactivated state and the alarm function has been primed, and the first operating mode is activated when the motor vehicle is in an activated state.

2. The device according to claim 1, wherein:

the at least one signal processing unit in the second operating mode detects the at least one sensor signal at a first instant and a second sensor signal at a second instant for producing the triggering signal for the alarm-signal generator.

3. The device according to claim 1, wherein:

one of the triggering signal for the functional unit and the triggering signal for the alarm-signal generator is generated when the at least one sensor signal exceeds a predefinable limiting value.

4. The device according to claim 1, wherein:

an evaluation of the at least one sensor signal in the second operating mode is started by an activation event.

5. The device according to claim 1, wherein:

wherein an activation of the second operating mode is performed at least one of cyclically, as a function of an output signal of an intrusion detection unit, and an output signal of another theft-warning device.

6. The device according to claim 1, wherein the sensor includes at least one of:

a radar sensor, an ultrasonic sensor, a speed sensor, a yaw-rate sensor, an acceleration sensor, a tire-pressure sensor, a travel sensor within a shock absorber, a force sensor for determining a vehicle weight, and a tank-level sensor.

7. The device according to claim 1, wherein:

an activation of the second operating mode is evaluated in accordance with a signal of at least one of at least one touch-sensitive door switch, a touch-sensitive locking switch, an ignition/starter switch, and an operating control element for activating an alarm-system function.

8. The device according to claim 1, wherein:

the sensor detects a surrounding field, and the alarm-signal generator is activated when a front distance and a rear distance change in a diametrically opposed manner.

9. A method for protecting a motor vehicle against theft, comprising:

detecting whether the motor vehicle is in a deactivated state or an alarm function has been primed;

if it is detected that the motor vehicle is in a deactivated state or an alarm function has been primed, cyclically obtaining signals from vehicle sensors that are used while the vehicle is activated in driving situations; and evaluating changes in the sensor signals to determine whether an unauthorized tampering of the vehicle exists.

* * * * *